Patented June 9, 1931

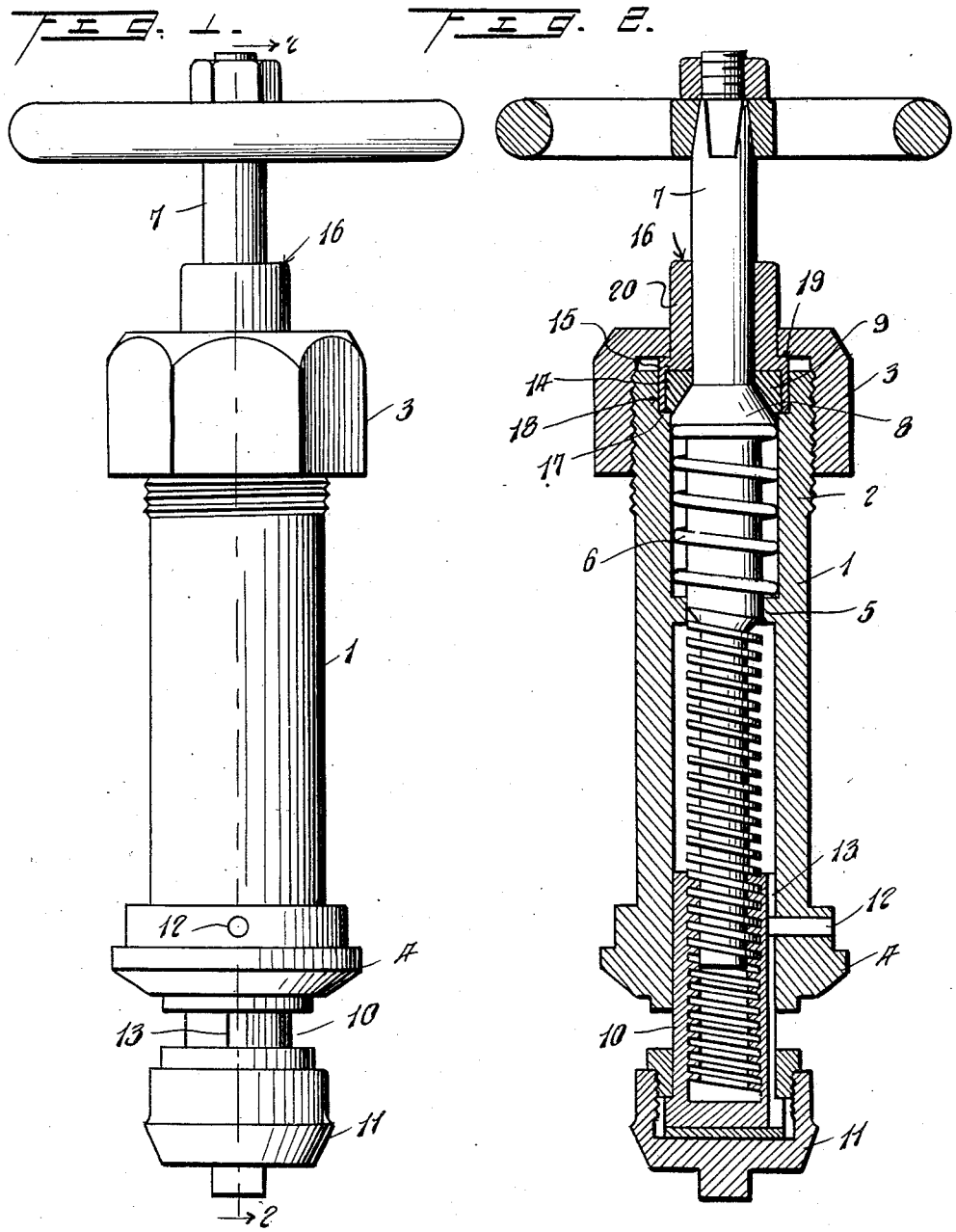

1,809,773

UNITED STATES PATENT OFFICE

LOYD H. CAIN, OF TYLER, TEXAS

PACKLESS VALVE

Application filed June 4, 1929, Serial No. 368,368. Renewed February 12, 1931.

This invention relates to a valve and it is aimed to provide a novel, simple and generally improved construction which is packless.

Another object is to provide a novel construction in the nature of an improvement over the valve disclosed in Letters Patent of the United States No. 1,540,539 issued to Frank Cain on June 2, 1925.

The specific objects and advantages will become apparent and in part be pointed out in the description following taken in connection with accompanying drawings illustrating an operative embodiment and wherein:

Figure 1 is a view in elevation illustrating the improved valve, and

Figure 2 is a central longitudinal sectional view of such valve taken substantially along the line 2—2 of Figure 1.

Referring specifically to the drawings wherein like reference characters designate like or similar parts, 1 designates the bonnet, as is usually provided for globe valves and which is of elongated tubular form having an externally threaded enlargement 2 at one end to receive the usual nut 3 and having an annular enlargement 4 at the other end which is adapted to engage the valve casing or like part (not shown). An inner annular shoulder 5 is provided intermediate the ends of the bonnet 1 and sustains the end thrust of a helical spring 6 mounted upon an operating stem 7 and engaging an annular enlargement 8 thereof to normally urge the stem toward the outer end of the bonnet and hold the enlargement 8 in contact with a metal hard rubber or composition seat 9. In this manner a close joint is maintained between the operating stem and the bonnet. The meeting faces of the annular enlargement 8 and the composition seat 9 are of conical or tapering formation to insure a close joint. The inner shoulder 5, besides forming an abutment for the spring 6, provides a guide for the operating stem 7, the lower portion of which is provided with a left screw thread to match a corresponding thread formed within a sleeve 10 which constitutes a tubular or hollow stem of a valve 11, which is connected to the lower end thereof by means of a swivel joint so as to insure a firm seating of the valve without any grinding action. Stem 10 is prevented from turning relatively to the bonnet by means of a pin 12 projecting inwardly from the enlargement 4 of the bonnet and into a longitudinal groove 13 in the stem 10.

The parts mentioned operate in the general way disclosed in said Patent No. 1,540,539 previously referred to.

In the present instance, the composition seating 9 is contained in a recess 14 of an enlarged lower portion 15 of a bearing sleeve 16. Such enlarged portion 15 and seating 9 rest on a shoulder 17 provided by enlarging the bore of the bonnet 1 at the upper end as at 18. The enlargement 15 provides a shoulder 19 which is overlapped by the cap nut 3 whereby the bearing sleeve 16 is rigidly held in such manner, in combination with seating 9, that fluid cannot pass the same.

The upper portion of the bearing sleeve 16 as at 20 is extended in order to form an extended bearing for the stem 7 so as to reenforce the same particularly against bending strain.

Various changes may be resorted to provided they fall within the spirit and scope of the invention.

I claim as my invention:—

1. A device of the class described comprising a tubular bonnet, a portion of the bore of which is enlarged, a valve stem therein having a conical enlargement, a bearing member for said valve stem seated in the enlarged portion of said bore and provided with a recess, a shoulder on said bearing member, means engaging said shoulder for securing the bearing member to the bonnet, and bearing material carried in the recess in the bearing member and engaged by said conical enlargement of the stem.

2. A valve of the class described having a bonnet provided with a shoulder, a stem in the bonnet having an enlargement, a bearing member for said stem resting on said shoulder, bearing material carried by the bearing member engaged by said stem enlargement, and means engaging the bonnet and clamping said bearing member against said shoulder.

3. A valve of the class described having a bonnet, said bonnet having a shoulder, a stem within the bonnet having a conical enlargement, a bearing member for the stem engaging said shoulder and itself provided with a shoulder, bearing material carried by the bearing member and engaging the first shoulder, said bearing material being engageable by said conical enlargement, and a nut engaging the second shoulder to secure the bearing member in place.

In testimony whereof I affix my signature.

LOYD H. CAIN.